US010807870B2

(12) United States Patent
Troiano

(10) Patent No.: US 10,807,870 B2
(45) Date of Patent: Oct. 20, 2020

(54) FINE PARTICLE COAL, AND SYSTEMS, APPARATUSES, AND METHODS FOR COLLECTING AND USING THE SAME

(71) Applicant: Somerset Coal International, Inc., Vandergrift, PA (US)

(72) Inventor: Richard Troiano, Vandergrift, PA (US)

(73) Assignee: Somerset Coal International, Inc., Vandergrift, PA (US)

( * ) Notice: Subject to any disclaimer, the term of this patent is extended or adjusted under 35 U.S.C. 154(b) by 0 days.

(21) Appl. No.: 16/518,161

(22) Filed: Jul. 22, 2019

(65) Prior Publication Data

US 2019/0337805 A1 Nov. 7, 2019

Related U.S. Application Data

(63) Continuation of application No. 14/723,697, filed on May 28, 2015, now Pat. No. 10,358,351.
(Continued)

(51) Int. Cl.
*C01B 32/00* (2017.01)
*C10B 53/04* (2006.01)
(Continued)

(52) U.S. Cl.
CPC .............. *C01B 32/00* (2017.08); *C01B 32/05* (2017.08); *C10B 53/04* (2013.01); *C10L 5/04* (2013.01);
(Continued)

(58) Field of Classification Search
CPC . C01B 32/05; C10L 5/04; C10L 5/366; C10L 9/00; C10L 2290/54; C10L 2250/06; C10L 2290/08; C21B 7/16; C21B 5/003; C10B 53/04; Y10T 428/2982; C01P 2004/61
See application file for complete search history.

(56) References Cited

U.S. PATENT DOCUMENTS 4,189,184 A 2/1980 Amero
4,318,779 A 3/1982 Tsuyuguchi et al.
(Continued)

FOREIGN PATENT DOCUMENTS

CA 2833972 A1 5/2014
EP 0099267 A2 1/1984
(Continued)

OTHER PUBLICATIONS

Das, S. "Performance of solid bowl centrifuge in dewatering coal-water slurry." Fuel and Energy Abstracts. vol. 6. No. 38. 1997.*
(Continued)

*Primary Examiner* — Richard M Rump
(74) *Attorney, Agent, or Firm* — Eversheds Sutherland (US) LLP

(57) ABSTRACT

Methods, apparatuses, and systems to collect fine particle coal are provided herein. For example, these methods, apparatuses, and systems may be incorporated into a coal processing plant to collect a portion of the fine particle coal that is normally lost in the system. A fine particle coal also is provided. The fine particle coal may have a particle size of 1000 μm or smaller and a water content of from about 5% to about 20%, by weight.

23 Claims, 2 Drawing Sheets

Related U.S. Application Data

(60) Provisional application No. 62/008,389, filed on Jun. 5, 2014.

(51) Int. Cl.
*C21B 7/16* (2006.01)
*C21B 5/00* (2006.01)
*C10L 5/04* (2006.01)
*C10L 5/36* (2006.01)
*C10L 9/00* (2006.01)
*C01B 32/05* (2017.01)

(52) U.S. Cl.
CPC ............... *C10L 5/366* (2013.01); *C10L 9/00* (2013.01); *C21B 5/003* (2013.01); *C21B 7/16* (2013.01); *C01P 2004/61* (2013.01); *C10L 2250/06* (2013.01); *C10L 2290/08* (2013.01); *C10L 2290/54* (2013.01); *Y10T 428/2982* (2015.01)

(56) References Cited

U.S. PATENT DOCUMENTS

| | | | |
|---|---|---|---|
| 4,406,664 | A | 9/1983 | Burgess et al. |
| 4,475,924 | A | 10/1984 | Meyer |
| 4,537,599 | A | 8/1985 | Greenwald, Sr. |
| 5,087,269 | A | 2/1992 | Cha et al. |
| 5,601,631 | A | 2/1997 | Rinker et al. |
| 6,284,017 | B1 | 9/2001 | Kamei et al. |
| 7,820,058 | B2 | 10/2010 | Yoon |
| 2012/0317878 | A1 | 12/2012 | Taulbee |
| 2013/0111808 | A1 | 5/2013 | Yoon |
| 2014/0144072 | A1 | 5/2014 | Bland et al. |

FOREIGN PATENT DOCUMENTS

| | | |
|---|---|---|
| GB | 800487 A | 8/1958 |
| RU | 2378324 C2 | 1/2010 |
| WO | 2009/018550 A1 | 2/2009 |
| WO | 2011/094680 A2 | 6/2011 |
| WO | 2013/188419 A1 | 12/2013 |

OTHER PUBLICATIONS

Mohanty, M. K., et al. "Screen bowl centrifuge: a high-efficiency particle size separator." Mining, Metallurgy & Exploration 25.2 (2008): 61-67.*

Klima, Mark S., Ian DeHart, and Ryan Coffman. "Baseline testing of a filter press and solid-bowl centrifuge for dewatering coal thickener underflow slurry." International Journal of Coal Preparation and Utilization 31.5 (2011): 258-272.*

Wen, W. W., and R. P. Killmeyer. "Centrifugal dewatering and reconstitution of fine coal: the GranuFlow process." Coal Preparation 17.1-2 (1996): 89-102.*

Klima et al., "Baseline testing of a filter press and solid-bowl centrifuge for dewatering coal thickener underflow slurry." International Journal of Coal Preparation and Utilization 31.5 (2011): 258-272.

Letki, "Know when to turn to centrifugal separation," Centrifuge Selection, Chemical Engineering Progress, Sep. 1998, 94(9):29-44.

Pinkerton et al., "Thickening of ultrafine coal-water slurries in a solid-bowl centrifuge," Pennsylvania State Univ., University Park, PA (US), 1999.

Mohanty, "Screen bowl centrifuge dewatering process: a parameteric study." Physical Separation in Science and Engineering 2007 (2007).

PCT International Search Report and Written Opinion for PCT Application No. PCT/US2015/032878 dated Dec. 9, 2015 (18 pages).

First Office Action for Ukrainian Patent Application No. 0201612721 dated Sep. 13, 2019.

European Office Action for EP Application No. 15730579.8 dated Feb. 18, 2020 (6 pages).

Kozlov et al., "Screen Bowl 'Decanter' Centrifuges as a Technical Basis for Dewatering Coal Sludge," UDC 622.7; 622.794.52, 2011, pp. 229-236.

* cited by examiner

FINE PARTICLE COAL, AND SYSTEMS, APPARATUSES, AND METHODS FOR COLLECTING AND USING THE SAME

CROSS-REFERENCE TO RELATED APPLICATIONS

This application is a continuation of U.S. patent application Ser. No. 14/723,697, filed May 28, 2015, which claims priority to U.S. Provisional Patent Application No. 62/008,389, filed Jun. 5, 2014. Both of these applications are incorporated herein by reference.

BACKGROUND

Coal preparation and processing plants are used to clean and/or separate run-of-mine (ROM) coal to obtain a clean coal product of a desired size and/or quality. For example, typical coal preparation plants may include a variety of crushing, breaking, sizing, beneficiation, storage, density separation, froth flotation, refuse, and/or impoundment units. However, in typical coal processing systems, quantities of fine particle coal are lost because current systems are unable to capture the fine particle coal. Accordingly, it would be desirable to provide systems, apparatuses, and methods to capture fine particle coal, and thereby improve process efficiency and reduce the amount of process waste in coal processing plants. Moreover, it would be desirable to provide a high quality fine particle coal product that may be used in a variety of applications, for example in pulverized coal injection, as coking coal, i.e., metallurgical coal, or as steam coal.

BRIEF SUMMARY OF THE DISCLOSURE

Methods of collecting fine particle coal are provided herein. In embodiments, the methods comprise dewatering a clean coal effluent slurry having a solids content of 30% or less, by weight, to produce a fine particle coal having a particle size of 1000 µm or smaller and a water content of from about 5% to about 20%, by weight.

Also provided herein are apparatuses and systems for collecting fine particle coal. The apparatuses, in embodiments, comprise a solid bowl centrifuge that retains a particle size of 1000 µm or smaller. The systems, in embodiments, comprise a dewatering apparatus that retains a particle size of 1000 µm or smaller.

Also provided herein is a fine particle coal. In embodiments, the fine particle coal has a particle size of 1000 µm or smaller and a water content of from about 5% to about 20%, by weight.

Also provided herein are methods of making coke and methods of making iron or steel. The methods of making coke, in embodiments, comprise heating, in the absence of air, a fine particle coal, or a blend comprising the fine particle coal and at least one other coal, for a time and temperature sufficient to convert the fine particle coal or the blend to coke, wherein the fine particle coal has a particle size of 1000 µm or smaller and a water content of from about 5% to about 20%, by weight. The methods of making iron or steel, in embodiments, comprise injecting a fine particle coal, or a blend comprising a fine particle coal and at least one other coal, into a blast furnace containing coke and iron ore, wherein the fine particle coal has a particle size of 1000 µm or smaller and a water content of from about 5% to about 20%, by weight.

DETAILED DESCRIPTION

Figure 1:
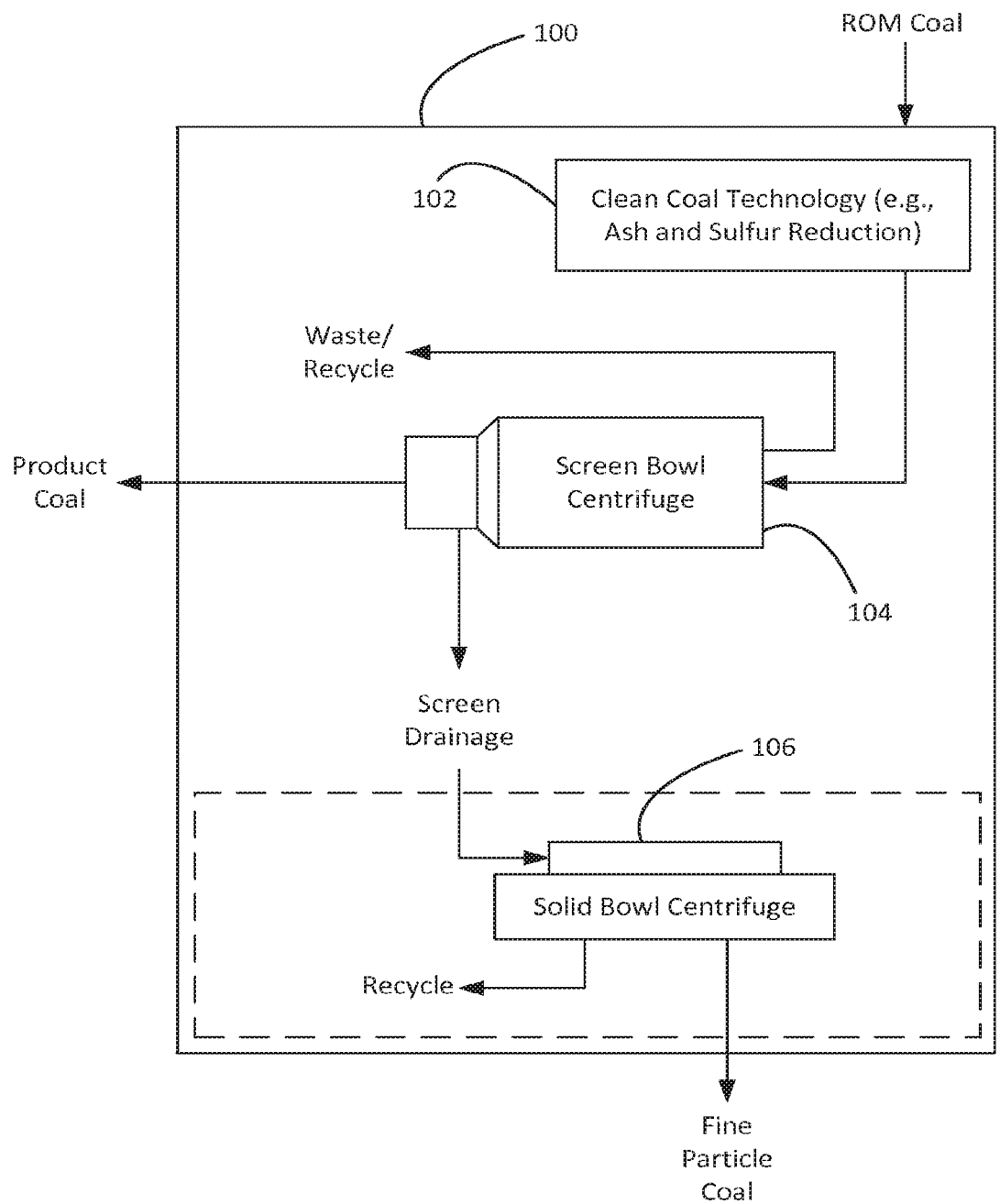
FIG. 1 is a partial plant diagram illustrating one embodiment of a system and apparatus for collecting fine particle coal in a clean coal circuit of a coal preparation plant.

Methods, apparatuses, and systems to collect fine particle coal are provided herein. For example, these methods, apparatuses, and systems may be incorporated into a coal processing plant to collect a portion of the fine particle coal that is normally lost in the system (e.g., fine particle coal that the system does not otherwise collect due to size and that is either recycled continuously through the system or discarded in a waste stream). In a typical clean coal processing system, 3% or more of the processed coal may be lost because the system is unable to capture this fine particle coal.

Additionally, fine particle coal and methods for its use are provided herein. The fine particle coal may have properties such as size, composition, and/or water content that make it useful in pulverized coal injection (PCI), as coking coal, i.e., metallurgical coal, or as steam coal. For example, the fine particle coal may be a high quality fine particle coal.

Methods, apparatuses, and systems are described herein, as well as fine particle coal and methods for its use.

Methods, Apparatuses, and Systems for Collecting Fine Particle Coal

In one aspect, a method of collecting fine particle coal is provided. The method may include collecting fine particle coal from a coal preparation or processing plant.

In embodiments, a method of collecting fine particle coal includes dewatering a clean coal effluent slurry having a solids content of 30% or less, by weight, to produce a fine particle coal having a particle size of 1000 µm or smaller and a water content of from about 5% to about 20%, by weight.

As used herein, the phrase "clean coal effluent slurry" refers to a mixture of water and coal particles that is present in a system, and in which the ash and/or sulfur content of the coal particles has been reduced from that of the run-of-mine coal from which the coal particles were derived. It should be understood that while embodiments disclosed herein refer to methods, apparatuses, and systems for collecting fine particle coal from a clean coal effluent slurry, the present disclosure is also intended to encompass other particle-containing slurries, including coal-containing slurries other than clean coal effluent slurries, as well as other processing slurries, such as mineral, ore, or other particle-containing slurries.

As used herein, the term "about" means plus or minus 10% of the numerical value of the number with which it is being used. The amounts of certain components, such as solids or water, of the effluent slurry and fine particle coal are present herein as percentages "by weight," and, unless otherwise noted, the phrase "by weight" refers to the total weight of the effluent slurry or fine particle coal, including the certain components.

The clean coal effluent slurry, in embodiments, has a solids content of from about 3% to about 25%, by weight. In other embodiments, the clean coal effluent slurry has a solids content of from about 10% to about 20%, by weight. In one embodiment, the clean coal effluent slurry has a solids content of about 17%, by weight.

In certain embodiments, the fine particle coal contains at least 95%, by weight, of the solids contained in the clean coal effluent slurry. In one embodiment, the fine particle coal contains at least 99%, by weight, of the solids contained in the clean coal effluent slurry.

In embodiments, the water content of the fine particle coal is from about 5% to about 15%, by weight. In particular embodiments, the water content of the fine particle coal is from about 5% to about 10%, by weight. In further embodiments, the water content of the fine particle coal is from about 5% to about 7%, by weight. In other embodiments, the water content of the fine particle coal is from about 6% to about 9%, by weight. In a particular embodiment, the water content of the fine particle coal is about 8%, by weight. In another embodiment, the water content of the fine particle coal is about 7%, by weight. When the fine particle coal is collected by the methods provided herein, the fine particle coal may have an elevated temperature for a certain period after collection. As used herein, the phrase "water content" refers to the amount of water in the fine particle coal after the temperature of the fine particle coal has returned to ambient temperature after the fine particle coal has been collected by the methods provided herein.

In embodiments, the fine particle coal has a particle size of 1000 μm or smaller. As used herein, the phrase "a particle size of from about X μm to about Y μm" or "particle size of about Z μm" means that the average largest dimension of the fine particle coal particles ranges from about X μm to about Y μm, or is about Z μm. The average largest dimension may be determined using any techniques known in the art, including, but not limited to, light scattering techniques.

In other embodiments, the fine particle coal has a particle size of from about 30 μm to about 1000 μm. In further embodiments, the fine particle coal has a particle size of from about 30 μm to about 900 μm. In some embodiments, the fine particle coal has a particle size of from about 30 μm to about 800 μm. In particular embodiments, the fine particle coal has a particle size of from about 30 μm to about 700 μm. In certain embodiments, the fine particle coal has a particle size of from about 30 μm to about 600 μm. In still further embodiments, the fine particle coal has a particle size of from about 30 μm to about 500 μm. In yet still further embodiments, the fine particle coal has a particle size of from about 30 μm to about 400 μm. In several embodiments, the fine particle coal has a particle size of from about 30 μm to about 300 μm. In a number of embodiments, the fine particle coal has a particle size of from about 30 μm to about 200 μm. In embodiments, the fine particle coal has a particle size of from about 30 μm to about 150 μm. In some embodiments, the fine particle coal has a particle size of from about 30 μm to about 125 μm. In other embodiments, the fine particle coal has a particle size of from about 30 μm to about 100 μm. In further embodiments, the fine particle coal has a particle size of from about 30 μm to about 75 μm. In still further embodiments, the fine particle coal has a particle size of from about 30 μm to about 50 μm. In yet another embodiment, the fine particle coal has a particle size of about 44 μm.

In embodiments, the fine particle coal has a particle size of 100 mesh or smaller. As used herein, the phrase "a particle size of X mesh or smaller" means that at least a substantial majority of the particles of a particular sample of the fine particle coal pass through X mesh or a mesh size greater than X. The fine particle coal, in embodiments, has a particle size of 200 mesh or smaller. The fine particle coal, in some embodiments, has a particle size of 325 mesh or smaller. The fine particle coal, in certain embodiments, has a particle size of 100 mesh or smaller, wherein from about 40% to about 60%, by weight, of the fine particle coal is retained by 325 mesh. The fine particle coal, in some embodiments, has a particle size of 100 mesh or smaller, wherein about 50%, by weight, of the fine particle coal is retained by 325 mesh.

Generally, dewatering the clean coal effluent slurry or another particle-containing slurry may be accomplished using known dewatering apparatuses, such as various types of centrifuges that can perform solid-liquid separation.

Figure 2:
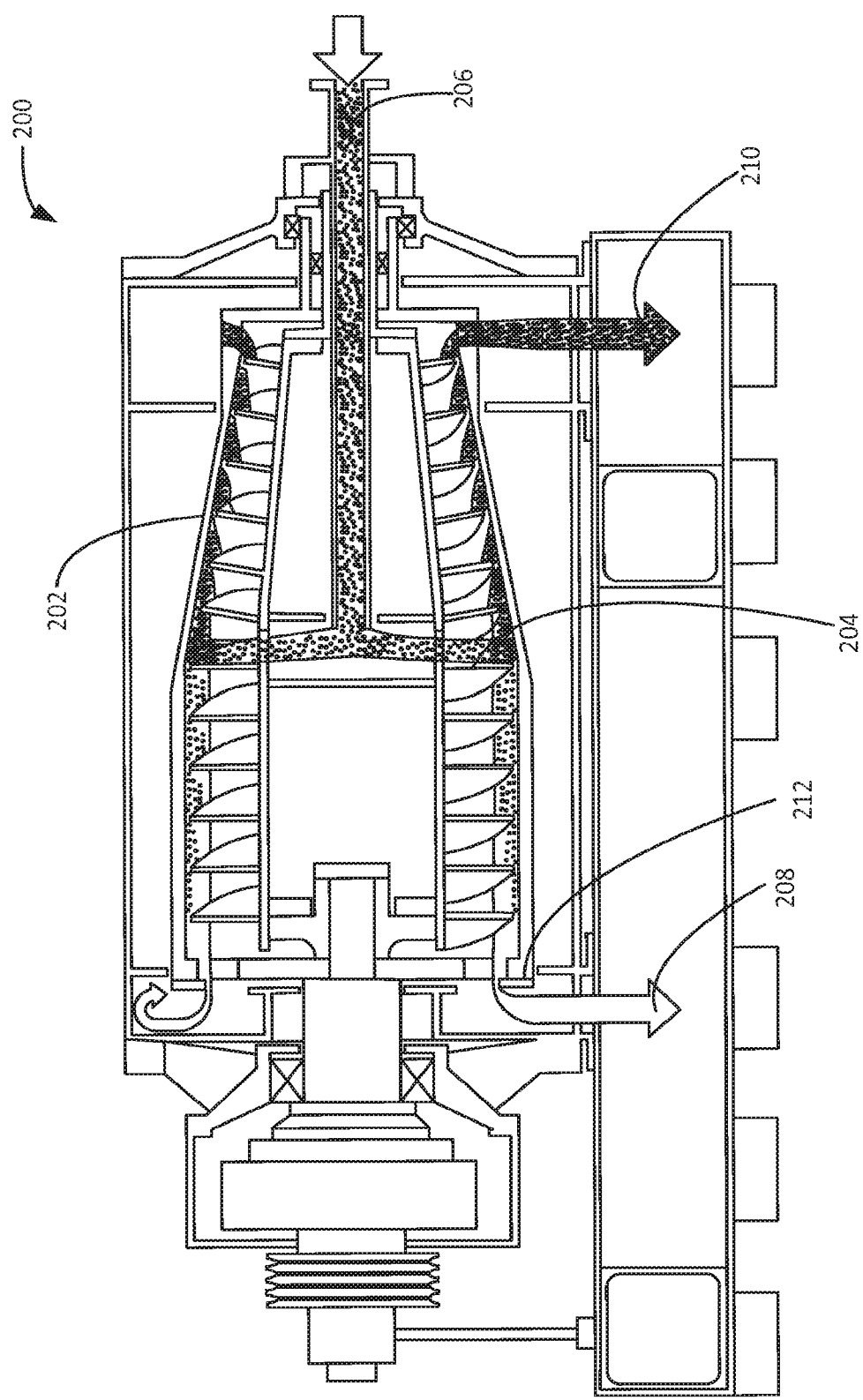
FIG. 2 is a cross-sectional view of one embodiment of a solid bowl centrifuge for collecting fine particle coal from a clean coal effluent slurry.

In embodiments, dewatering the clean coal effluent slurry includes centrifuging the slurry in a solid bowl centrifuge. As used herein, the phrase "solid bowl centrifuge" refers to a centrifuge having a solid outer bowl construction and that continuously separates two substances with different densities using the centrifugal force resulting from rotation. As shown in FIG. 2, in one embodiment, a solid bowl centrifuge 200 includes a solid outer rotating bowl 202 and an internal rotating scroll 204. In certain embodiments, the centrifuge 200 includes a weir plate 212 that controls the pool depth in the centrifuge.

In certain embodiments, as shown in FIG. 2, in operation, an input, or feed, stream 206, such as a clean coal effluent slurry or other particle-containing slurry, is introduced to the centrifuge 200 and delivered to the solid bowl 202 via one or more ports. Both the solid bowl 202 and the internal scroll, or screw, 204 rotate to separate the components of the feed 206 based on their densities. The scroll 204 acts as a conveyor and rotates at a differential speed relative to the bowl 202 to permit the continuous removal of solid particles 210 (e.g., fine particle coal) from the wastewater 208.

Suitable solid bowl centrifuges may include those manufactured by Centrisys Centrifuge Systems (Kenosha, Wis.). For example, the solid bowl centrifuge may include any design, features, or combination of features disclosed herein and/or known to those of ordinary skill in the art, to achieve the desired separation.

In certain embodiments, methods further include adjusting, based on properties of the clean coal effluent slurry, properties of the fine particle coal, or both, at least one parameter selected from: centrifugal torque, differential rotational speed between the rotating bowl and the internal scroll, and dam height of the weir plate. That is, one, two, or all three of these parameters may be adjusted based on the properties of the feed and/or the desired output, such as the water content, solids content, and/or particle size.

For example, the differential speed may be selected based on the particles being separated to avoid damage and to match the density ranges. For example, solid bowl centrifuges may be operated with centrifugal forces in excess of 1000 times, such as 3000 times, the force of gravity such that the denser solid particles are pressed outwards against the rotating bowl wall and the less dense liquid phase forms a concentric inner layer. For example, the speed and torque of the centrifuge may be adjusted based upon the density and/or turbidity of the feed slurry.

For example, in a clean coal effluent slurry, the fine particle coal may have a specific gravity of 2.0 or less, such as from about 1.5 to about 1.6, or about 1.55. Because the specific gravity of particles may vary relatively significantly due to the impurities present in the particles, the centrifuge parameters may be adjusted accordingly. Moreover, it should be understood that a wide variety of additional system parameters, such as spin velocity, temperature, and flow rate, may also be adjusted.

Generally, these parameters may be adjusted manually or through the use of a computer control, the latter of which permits the automated and continual adjustment of each parameter. Computer control systems are discussed in detail below.

In embodiments, as shown in FIG. 1, the step of dewatering occurs in the clean coal circuit of a coal processing plant. As used herein, the phrase "clean coal circuit" refers to the portion of a coal processing plant in which the ash and/or sulfur content of the coal particles is reduced from that of the run-of-mine coal from which the coal particles were derived. Thus, in certain embodiments, a solid bowl centrifuge 106 for dewatering a clean coal effluent slurry is provided downstream of one or more clean coal technology units 102, within a coal processing plant 100.

In embodiments, the step of dewatering occurs downstream of processing that does not collect fine particle coal having a particle size of 325 mesh or smaller. For example, other separators such as centrifuges, cyclones, floatation cells, or screens, which are not capable of collecting fine particle coal having a particle size of 325 mesh or smaller may be present upstream of the dewatering apparatus.

In certain embodiments, as shown in FIG. 1, a solid bowl centrifuge 106 is located downstream of a screen bowl centrifuge 104 that does not collect fine particle coal having a particle size of 325 mesh or smaller. That is, the solid bowl centrifuge is designed and located to effectively capture fine particle coal that otherwise recirculates in a recycle stream or is discarded in a waste stream.

In embodiments, the step of dewatering occurs upstream of processing that does collect fine particle coal having a particle size of 325 mesh or smaller. Typically, such processing would include waste processing. For example, the processing that does collect fine particle coal having a particle size of 325 mesh or smaller may include a thickener unit.

In operation, for example in the plant layout shown in FIG. 1, if the screen drainage of the screen bowl centrifuge is not recycled, there is a significant loss of product and increased waste. However, if the screen drainage is recycled, the slurry particle size distribution will reduce over the operating cycle, thereby reducing yield and increasing wear on the screen. The present methods, apparatuses, and systems remedy these issues by collecting the fine particle coal from the screen drainage, thereby improving yield of the overall plant and increasing the lifespan of other plant equipment. Moreover, the fine particle coal produced by these methods, apparatuses, and systems displays high quality coal properties and may be used in a variety of applications, as described in detail below.

Methods of collecting fine particle coal is described herein. In embodiments, the methods of collecting fine particle coal comprises dewatering a clean coal effluent slurry having a solids content of 30% or less, by weight, to produce a fine particle coal having a particle size of 1000 μm or smaller and a water content of from about 5% to about 20%, by weight. In some embodiments, dewatering the clean coal effluent slurry comprises centrifuging the slurry in a solid bowl centrifuge. The solid bowl centrifuge may include a rotating bowl, an internal scroll, and a weir plate. The methods provided herein may include adjusting, based on properties of the clean coal effluent slurry, properties of the fine particle coal, or both, at least one parameter selected from the group consisting of centrifugal torque, differential rotational speed between the rotating bowl and the internal scroll, and dam height of the weir plate. The step of dewatering may occur in the clean coal circuit of a coal processing plant. The step of dewatering may occur downstream of processing that does not collect fine particle coal having a particle size of 325 mesh or smaller. The step of dewatering may occur upstream of processing that does collect fine particle coal having a particle size of 325 mesh or smaller. The processing that does collect fine particle coal having a particle size of 325 mesh or smaller may comprise a thickener. The clean coal effluent slurry, in particular embodiments, has a solids content of from about 3% to about 25%, by weight; from about 10% to about 20%, by weight; or about 17%, by weight. The fine particle coal, in embodiments, contains at least 95%, by weight, of the solids contained in the clean coal effluent slurry. In further embodiments, the fine particle coal contains at least 99%, by weight, of the solids contained in the clean coal effluent slurry. The water content of the fine particle coal, in embodiments, is from about 5% to about 15%, by weight; from about 5% to about 10%, by weight; from about 5% to about 7%, by weight; from about 6% to about 9%, by weight; about 8%, by weight; or about 7%, by weight. The particle size of the fine particle coal may be 100 mesh or smaller. In embodiments, from about 40% to about 60%, by weight, of the fine particle coal is retained by 325 mesh; or about 50%, by weight, of the fine particle coal is retained by 325 mesh. The particle size of the fine particle coal may be 325 mesh or smaller. The particle size of the fine particle coal may be from about 30 μm to about 1000 μm; from about 30 μm to about 900 μm; from about 30 μm to about 800 μm; from about 30 μm to about 700 μm; from about 30 μm to about 600 μm; from about 30 μm to about 500 μm; from about 30 μm to about 400 μm; from about 30 μm to about 300 μm; or from about 30 μm to about 200 μm; from about 30 μm to about 150 μm; from about 30 μm to about 125 μm; from about 30 μm to about 100 μm; from about 30 μm to about 75 μm; from about 30 μm to about 50 μm; or about 44 μm.

In another aspect, an apparatus for collecting fine particle coal is provided. For example, the apparatus may include any of the features disclosed herein, as well as any combination of features disclosed herein, and/or known to those of ordinary skill in the art, to achieve the desired separation.

In embodiments, an apparatus for collecting fine particle coal from a clean coal effluent slurry includes a solid bowl centrifuge that retains a particle size of 1000 μm or smaller. For example, the solid bowl centrifuge may be configured to retain any of the fine coal particle sizes disclosed herein. In one embodiment, the solid bowl centrifuge retains a particle size of 100 mesh or smaller. In one embodiment, the solid bowl centrifuge retains a particle size of 325 mesh or smaller.

In embodiments, the apparatus includes a solid bowl centrifuge including a rotating bowl, an internal scroll, and a weir plate, wherein at least one parameter selected from the group including centrifugal torque, differential rotational speed between the rotating bowl and the internal scroll, and dam height of the weir plate, is adjustable based on properties of the clean coal effluent slurry, properties of the fine particle coal, or both. In one embodiment, each parameter of the group including centrifugal torque, differential rotational speed between the rotating bowl and the internal scroll, and dam height of the weir plate, is adjustable based on properties of the clean coal effluent slurry, properties of the fine particle coal, or both.

In embodiments, the apparatus includes a solid bowl centrifuge configured to dewater the clean coal effluent slurry having a solids content of 30% or less, by weight, to produce a fine particle coal having a water content of from about 5% to about 20%, by weight.

Apparatuses are provided herein for collecting fine particle coal. In embodiments, the apparatuses for collecting fine particle coal from a clean coal effluent slurry comprise a solid bowl centrifuge that retains a particle size of 1000 µm or smaller. The solid bowl centrifuge may retain a particle size of 100 mesh or smaller; or 325 mesh or smaller. The solid bowl centrifuge also may comprise a rotating bowl, an internal scroll, and a weir plate, and at least one parameter selected from the group consisting of centrifugal torque, differential rotational speed between the rotating bowl and the internal scroll, and dam height of the weir plate, may be adjustable based on properties of the clean coal effluent slurry, properties of the fine particle coal, or both. The solid bowl centrifuge also may comprise a rotating bowl, an internal scroll, and a weir plate, and each parameter of the group consisting of centrifugal torque, differential rotational speed between the rotating bowl and the internal scroll, and dam height of the weir plate, may be adjustable based on properties of the clean coal effluent slurry, properties of the fine particle coal, or both. The solid bowl centrifuge may be configured to dewater the clean coal effluent slurry having a solids content of 30% or less, by weight, to produce a fine particle coal having a water content of from about 5% to about 20%, by weight.

In another aspect, a system for collecting fine particle coal is provided. For example, the system may include any of the features disclosed herein, as well as any combination of features disclosed herein, and/or known to those of ordinary skill in the art, to achieve the desired separation.

In embodiments, a system for collecting fine particle coal includes a dewatering apparatus that retains a particle size of 1000 µm or smaller. For example, the dewatering apparatus may be configured to retain any of the fine coal particle sizes disclosed herein. In one embodiment, the dewatering apparatus retains a particle size of 100 mesh or smaller. In one embodiment, the dewatering apparatus retains a particle size of 325 mesh or smaller. In certain embodiments, the dewatering apparatus includes a solid bowl centrifuge.

In embodiments, the system includes a clean coal circuit of a coal processing plant, the dewatering apparatus being located in the clean coal circuit. In certain embodiments, the dewatering apparatus is located downstream of processing units that do not collect fine particle coal having a particle size of 325 mesh or smaller. In one embodiment, the dewatering apparatus is located upstream of a processing unit that does collect fine particle coal having a particle size of 325 mesh or smaller. For example, the processing unit that does collect fine particle coal having a particle size of 325 mesh or smaller may include a thickener.

In embodiments, a feed of the dewatering apparatus includes a clean coal effluent slurry having a solids content of 30% or less, by weight. In certain embodiments, a feed of the dewatering apparatus includes a clean coal effluent slurry having a solids content of from about 3% to about 25%, by weight. In further embodiments, a feed of the dewatering apparatus includes a clean coal effluent slurry having a solids content of from about 10% to about 20%, by weight. In one embodiment, a feed of the dewatering apparatus includes a clean coal effluent slurry having a solids content of about 17%, by weight.

In embodiments, an output of the dewatering apparatus includes a fine particle coal having a water content of from about 5% to about 20%, by weight. In certain embodiments, an output of the dewatering apparatus includes a fine particle coal having a water content from about 5% to about 15%, by weight. In further embodiments, an output of the dewatering apparatus includes a fine particle coal having a water content from about 5% to about 10%, by weight. In particular embodiments, an output of the dewatering apparatus includes a fine particle coal having a water content from about 5% to about 7%, by weight. In other embodiments, an output of the dewatering apparatus includes a fine particle coal having a water content from about 6% to about 9%, by weight. In one embodiment, an output of the dewatering apparatus includes a fine particle coal having a water content of about 8%, by weight. In another embodiment, an output of the dewatering apparatus includes a fine particle coal having a water content of about 7%, by weight.

In certain embodiments, a feed of the dewatering apparatus includes a clean coal effluent slurry, an output of the dewatering apparatus includes a fine particle coal, and the fine particle coal contains at least 95%, by weight, of the solids contained in the clean coal effluent slurry. In other embodiments, a feed of the dewatering apparatus includes a clean coal effluent slurry, an output of the dewatering apparatus includes a fine particle coal, and the fine particle coal contains at least 99%, by weight, of the solids contained in the clean coal effluent slurry.

In embodiments, an output of the dewatering apparatus includes a fine particle coal, and from about 40% to about 60%, by weight, of the fine particle coal is retained by 325 mesh. In certain embodiments, an output of the dewatering apparatus includes a fine particle coal, and about 50%, by weight, of the fine particle coal is retained by 325 mesh.

In embodiments, a feed of the dewatering apparatus includes a clean coal effluent slurry, an output of the dewatering apparatus includes a fine particle coal, the dewatering apparatus includes a solid bowl centrifuge that includes a rotating bowl, an internal scroll, and a weir plate, and at least one parameter selected from the group consisting of centrifugal torque, differential rotational speed between the rotating bowl and the internal scroll, and dam height of the weir plate, is adjustable based on properties of the clean coal effluent slurry, properties of the fine particle coal, or both.

In embodiments, the system includes at least one memory that stores computer-executable instructions and at least one controller configured to access the at least one memory, wherein the at least one controller is configured to execute the computer-executable instructions to receive, from an interface, properties of the clean coal effluent slurry, properties of the fine particle coal, or both, and direct, in response to receipt of the properties, adjustment of at least one parameter selected from the group consisting of centrifugal torque, differential rotational speed between the rotating bowl and the internal scroll, and dam height of the weir plate. For example, the interface may include a manual or computer-based interface via which the parameters may be adjusted. In one embodiment, the interface includes at least one suitable sensor configured to detect the relevant properties of the clean coal effluent slurry.

For example, the controller(s) may include any suitable processing unit capable of accepting digital data as input, processing the input data in accordance with stored computer-executable instructions, and generating output data. The controller(s) may be configured to execute the computer-executable instructions to cause or facilitate the performance of various operations, such as adjustments to the parameters. The controller(s) may be further configured to utilize and direct various hardware resources available in the apparatuses or systems disclosed herein, to perform adjustments of the various parameters, facilitate storage of data, and so forth. The controller(s) may include any type of suitable processing unit including, but not limited to, a central processing unit, a microprocessor, a microcontroller, a Reduced Instruction Set Computer (RISC) microprocessor, a Complex Instruction Set Computer (CISC) microprocessor, an Application Specific Integrated Circuit (ASIC), a Field-Programmable Gate Array (FPGA), a System-on-a-Chip (SoC), and so forth.

The memory may store computer-executable instructions that are loadable and executable by the controller(s) as well as data manipulated and/or generated by the controller(s) during the execution of the computer-executable instructions. The memory may include volatile memory (memory that maintains its state when supplied with power) such as random access memory (RAM) and/or non-volatile memory (memory that maintains its state even when not supplied with power) such as read-only memory (ROM), flash memory, and so forth. In certain embodiments, the memory includes multiple different types of memory, such as various types of static random access memory (SRAM), various types of dynamic random access memory (DRAM), various types of unalterable ROM, and/or writeable variants of ROM such as electrically erasable programmable read-only memory (EEPROM), flash memory, and so forth. In certain embodiments, the memory includes at least one data store.

The systems or apparatuses may further include additional data store(s), such as removable storage and/or non-removable storage including, but not limited to, magnetic storage, optical disk storage, and/or tape storage. Data store(s) may provide storage of computer-executable instructions and other data. The data store(s) may include storage that is internal and/or external to the system or apparatus. The memory and/or the data store(s), removable and/or non-removable, are examples of computer-readable storage media (CRSM).

The memory may store data, computer-executable instructions, applications, and/or various program modules including, for example, one or more operating systems, one or more database management systems (DBMS), and one or more program modules such as data determination module, interface signal module, and sensor module.

The operating system (O/S) may provide an interface between other applications and/or program modules executable by the system or apparatus and hardware resources of the system or apparatus. More specifically, the O/S may include a set of computer-executable instructions for managing hardware resources of the system or apparatus and for providing common services to other applications and/or program modules (e.g., managing memory allocation among various applications and/or program modules). The O/S may include any operating system now known or which may be developed in the future including, but not limited to, any desktop or laptop operating system, any server operating system, any mobile operating system, any mainframe operating system, or any other proprietary or non-proprietary operating system.

The DBMS may support functionality for accessing, retrieving, storing, and/or manipulating data stored in one or more data stores provided externally to the dispensing system and/or one or more internal data stores provided, for example, as part of the data store(s). The DBMS may use any of a variety of database models (e.g., relational model, object model, etc.) and may support any of a variety of query languages. For example, the DBMS may allow for external accessing and retrieving of the data.

The system or apparatus may further include one or more input/output (I/O) interfaces that may facilitate receipt, by the system or apparatus, of information input via one or more I/O devices configured to communicate with the system or apparatus as well as the outputting of information from the system or apparatus to the one or more I/O devices.

The I/O devices may include, but are not limited to, a user interface such as buttons or a hand wave sensor, a display, a keypad, a keyboard, a pointing device, a control panel, a touch screen display, a remote control device, a speaker, a microphone, a printing device, other peripheral devices, and so forth. The system may further include one or more network interfaces that may facilitate communication between the system or apparatus and other components.

It should be understood that any of the components of the systems or apparatuses described herein may include alternate and/or additional hardware, software, or firmware components beyond those described without departing from the scope of the disclosure. More particularly, it should be appreciated that software, firmware, or hardware components described as forming part of any of the components of the system or apparatus are merely illustrative and that some components may not be present or additional components may be provided in various embodiments.

While various program modules have been described with respect to various illustrative components of the systems and apparatuses, it should be appreciated that functionality described as being supported by the program modules may be enabled by any combination of hardware, software, and/or firmware. It should further be appreciated that each of the above-mentioned modules may, in various embodiments, represent a logical partitioning of supported functionality. This logical partitioning is described for ease of explanation of the functionality and may not be representative of the structure of software, firmware and/or hardware for implementing the functionality. Accordingly, it should be appreciated that functionality described as being provided by a particular module may, in various embodiments, be provided at least in part by one or more other modules. Further, one or more modules may not be present in certain embodiments, while in other embodiments, additional modules not described may be present and may support at least a portion of the described functionality and/or additional functionality. Moreover, while certain modules may be described as sub-modules of another module, in certain embodiments, such modules may be provided as independent modules.

Systems for collecting fine particle coal are described herein. In embodiments, the system for collecting fine particle coal may comprise a dewatering apparatus that retains a particle size of 1000 μm or smaller. The dewatering apparatus may retain a particle size of 100 mesh or smaller; or 325 mesh or smaller. The dewatering apparatus may comprise a solid bowl centrifuge. The system may comprise a clean coal circuit of a coal processing plant, the dewatering apparatus being located in the clean coal circuit. The dewatering apparatus may be located downstream of processing units that do not collect fine particle coal having a particle size of 325 mesh or smaller. The dewatering apparatus may be located upstream of a processing unit that does collect fine particle coal having a particle size of 325 mesh or smaller. The processing unit that does collect fine particle coal having a particle size of 325 mesh or smaller may comprise a thickener. A feed of the dewatering apparatus may comprise a clean coal effluent slurry having a solids content of 30% or less, by weight. A feed of the dewatering apparatus may comprise a clean coal effluent slurry having a solids content of from about 3% to about 25%, by weight. A feed of the dewatering apparatus may comprise a clean coal effluent slurry having a solids content of from about 10% to about 20%, by weight; or about 17%, by weight. An output of the dewatering apparatus may comprise a fine particle coal having a water content of from about 5% to about 20%, by weight; from about 5% to about 15%, by weight; from about 5% to about 10%, by weight; from about 5% to about 7%, by weight; from about 6% to about 9%, by weight; about 8%, by weight; or about 7%, by weight. Within the systems described herein, a feed of the dewatering apparatus may comprise a clean coal effluent slurry, an output of the dewatering apparatus may comprise a fine particle coal, and/or the fine particle coal may contain at least 95%, by weight, or at least 99%, by weight, of the solids contained in the clean coal effluent slurry. Within the systems described herein, an output of the dewatering apparatus may comprise a fine particle coal, and/or from about 40% to about 60%, by weight, or about 50%, by weight, of the fine particle coal is retained by 325 mesh. Also, within the systems described herein, a feed of the dewatering apparatus may comprise a clean coal effluent slurry, an output of the dewatering apparatus may comprise a fine particle coal, the dewatering apparatus may comprise a solid bowl centrifuge that comprises a rotating bowl, an internal scroll, and a weir plate, and/or at least one parameter selected from the group consisting of centrifugal torque, differential rotational speed between the rotating bowl and the internal scroll, and dam height of the weir plate, may be adjustable based on properties of the clean coal effluent slurry, properties of the fine particle coal, or both. The systems described herein also may comprise at least one memory that stores computer-executable instructions; and at least one controller configured to access the at least one memory, wherein the at least one controller may be configured to execute the computer-executable instructions to (1) receive, from an interface, properties of the clean coal effluent slurry, properties of the fine particle coal, or both, and (2) direct, in response to receipt of the properties, adjustment of at least one parameter selected from the group consisting of centrifugal torque, differential rotational speed between the rotating bowl and the internal scroll, and dam height of the weir plate. The interface may comprise a manual user interface. The interface may comprise at least one sensor configured to detect the properties of the clean coal effluent slurry.

Fine Particle Coal and Methods for its Use

In one aspect, a fine particle coal is provided. The fine particle coal may be produced by the methods, apparatuses, and systems described herein. The fine particle coal may be used for pulverized coal injection (PCI), as coking coal, i.e., metallurgical coal, or as steam coal.

The fine particle coal, in embodiments, has a water content of from about 5% to about 20%, by weight. The fine particle coal, in some embodiments, has a water content of from about 5% to about 15%, by weight. The fine particle coal, in other embodiments, has a water content of from about 5% to about 10%, by weight. The fine particle coal, in particular embodiments, has a water content of from about 5% to about 7%, by weight. The fine particle coal, in certain embodiments, has a water content of from about 6% to about 9%, by weight. The fine particle coal, in further embodiments, has a water content of about 8%, by weight. The fine particle coal, in still further embodiments, has a water content of about 7%, by weight. When the fine particle coal is collected by the methods provided herein, the fine particle coal may have an elevated temperature for a certain period after collection.

In embodiments, the fine particle coal has a particle size of 1000 μm or smaller. The average largest dimension may be determined using any techniques known in the art, including, but not limited to, light scattering techniques. In other embodiments, the fine particle coal has a particle size of from about 30 μm to about 1000 μm. In further embodiments, the fine particle coal has a particle size of from about 30 μm to about 900 μm. In some embodiments, the fine particle coal has a particle size of from about 30 μm to about 800 μm. In particular embodiments, the fine particle coal has a particle size of from about 30 μm to about 700 μm. In certain embodiments, the fine particle coal has a particle size of from about 30 μm to about 600 μm. In still further embodiments, the fine particle coal has a particle size of from about 30 μm to about 500 μm. In yet still further embodiments, the fine particle coal has a particle size of from about 30 μm to about 400 μm. In several embodiments, the fine particle coal has a particle size of from about 30 μm to about 300 μm. In a number of embodiments, the fine particle coal has a particle size of from about 30 μm to about 200 μm.

In embodiments, the fine particle coal has a particle size of from about 30 μm to about 150 μm. In some embodiments, the fine particle coal has a particle size of from about 30 μm to about 125 μm. In other embodiments, the fine particle coal has a particle size of from about 30 μm to about 100 μm. In further embodiments, the fine particle coal has a particle size of from about 30 μm to about 75 μm. In still further embodiments, the fine particle coal has a particle size of from about 30 μm to about 50 μm. In yet another embodiment, the fine particle coal has a particle size of about 44 μm.

In embodiments, the fine particle coal has a particle size of 100 mesh or smaller. The fine particle coal, in embodiments, has a particle size of 200 mesh or smaller. The fine particle coal, in some embodiments, has a particle size of 325 mesh or smaller. The fine particle coal, in certain embodiments, has a particle size of 100 mesh or smaller, wherein from about 40% to about 60%, by weight, of the fine particle coal is retained by 325 mesh. The fine particle coal, in some embodiments, has a particle size of 100 mesh or smaller, wherein about 50%, by weight, of the fine particle coal is retained by 325 mesh.

In embodiments, the fine particle coal has a water content of from about 5% to about 20%, by weight, and a particle size of 1000 μm or smaller. In embodiments, the fine particle coal has a water content of from about 5% to about 20%, by weight, and a particle size of 100 mesh or smaller. In some embodiments, the fine particle coal has a water content of from about 5% to about 20%, by weight, and a particle size of 325 mesh or smaller. In further embodiments, the fine particle coal has a water content of from about 5% to about 20%, by weight, and a particle size of 100 mesh or smaller, wherein from about 40% to about 60%, by weight, of the fine particle coal is retained by 325 mesh.

In embodiments, the fine particle coal has a water content of from about 5% to about 20%, by weight, and a particle size of from about 30 μm to about 150 μm. In some embodiments, the fine particle coal has a water content of from about 5% to about 20%, by weight, and a particle size of from about 30 μm to about 50 μm. In further embodiments, the fine particle coal has a water content of from about 5% to about 20%, by weight, and a particle size of about 44 μm.

In embodiments, the fine particle coal has a water content of from about 5% to about 15%, by weight, and a particle size of 1000 μm or smaller. In embodiments, the fine particle coal has a water content of from about 5% to about 15%, by weight, and a particle size of 100 mesh or smaller. In some embodiments, the fine particle coal has a water content of from about 5% to about 10%, by weight, and a particle size of 100 mesh or smaller. In further embodiments, the fine particle coal has a water content of about 8%, by weight, and a particle size of 100 mesh or smaller.

In embodiments, the fine particle coal has a water content of from about 5% to about 15%, by weight, and a particle size of from about 30 μm to about 150 μm. In some embodiments, the fine particle coal has a water content of from about 5% to about 10%, by weight, and a particle size of from about 30 μm to about 150 μm. In further embodiments, the fine particle coal has a water content of about 8%, by weight, and a particle size of from about 30 μm to about 150 μm.

In embodiments, the fine particle coal has a water content of from about 5% to about 15%, by weight, and a particle size of 325 mesh or smaller. In some embodiments, the fine particle coal has a water content of from about 5% to about 15%, by weight, and a particle size of 100 mesh or smaller, wherein from about 40% to about 60%, by weight, of the fine particle coal is retained by 325 mesh.

In embodiments, the fine particle coal has a water content of from about 5% to about 15%, by weight, and a particle size of from about 30 μm to about 50 μm. In some embodiments, the fine particle coal has a water content of from about 5% to about 15%, by weight, and a particle size of about 44 μm.

In embodiments, the fine particle coal has a water content of from about 5% to about 10%, by weight, and a particle size of 1000 μm or smaller. In embodiments, the fine particle coal has a water content of from about 5% to about 10%, by weight, and a particle size of 325 mesh or smaller. In some embodiments, the fine particle coal has a water content of from about 5% to about 10%, by weight, and a particle size of 100 mesh or smaller, wherein from about 40% to about 60%, by weight, of the fine particle coal is retained by 325 mesh.

In embodiments, the fine particle coal has a water content of from about 5% to about 10%, by weight, and a particle size of from about 30 μm to about 150 μm. In some embodiments, the fine particle coal has a water content of from about 5% to about 10%, by weight, and a particle size of about 44 μm.

In embodiments, the fine particle coal has a water content of about 8%, by weight, and a particle size of 1000 μm or smaller. In embodiments, the fine particle coal has a water content of about 8%, by weight, and a particle size of 325 mesh or smaller. In some embodiments, the fine particle coal has a water content of about 8%, by weight, and a particle size of 100 mesh or smaller, wherein from about 40% to about 60%, by weight, of the fine particle coal is retained by 325 mesh.

In embodiments, the fine particle coal has a water content of about 8%, by weight, and a particle size of from about 30 μm to about 50 μm. In some embodiments, the fine particle coal has a water content of about 8%, by weight, and a particle size of about 44 μm.

In embodiments, the fine particle coal has a relatively high BTU (British thermal unit/lb.). As used herein, the phrase "relatively high BTU" means a BTU of from about 12,000 to about 16,000 when the fine particle coal has a water content of from about 5% to about 20%, by weight. The fine particle coal having a relatively high BTU may be suitable for use as coking coal, i.e., metallurgical coal, PCI, steam coal, or a combination thereof. In certain embodiments, the fine particle coal has a BTU of from about 12,400 to about 14,000 and a water content of from about 5% to about 20%, by weight. In one embodiment, the fine particle coal has a BTU of about 12,500 and a water content of from about 5% to about 20%, by weight. In some embodiments, the fine particle coal has a BTU of from about 12,800 to about 16,000 and a water content of from about 5% to about 20%, by weight. In an embodiment, the fine particle coal has a BTU of about 13,500 and a water content of from about 5% to about 20%, by weight. In particular embodiments, the fine particle coal has a BTU of from about 13,500 to about 16,000 and a water content of from about 5% to about 20%, by weight. In another embodiment, the fine particle coal has a BTU of about 14,000 and a water content of from about 5% to about 20%, by weight. In further embodiments, the fine particle coal has a BTU of from about 14,000 to about 16,000 and a water content of from about 5% to about 20%, by weight. In still further embodiments, the fine particle coal has a BTU of from about 15,000 to about 16,000 and a water content of from about 5% to about 20%, by weight. In additional embodiments, the fine particle coal has a BTU of about 15,500 and a water content of from about 5% to about 20%, by weight.

In embodiments, the fine particle coal has a BTU of from about 12,000 to about 16,000, a water content of from about 5% to about 15%, by weight, and a particle size of 1000 μm or smaller. In embodiments, the fine particle coal has a BTU of from about 12,000 to about 16,000, a water content of from about 5% to about 15%, by weight, and a particle size of 100 mesh or smaller. In further embodiments, the fine particle coal has a BTU of from about 14,000 to about 16,000, a water content of from about 5% to about 10%, by weight, and a particle size of 100 mesh or smaller, wherein from about 40% to about 60%, by weight, of the fine particle coal is retained by 325 mesh.

In embodiments, the fine particle coal has a BTU of from about 12,000 to about 16,000, a water content of from about 5% to about 15%, by weight, and a particle size of from about 30 μm to about 150 μm. In further embodiments, the fine particle coal has a BTU of from about 14,000 to about 16,000, a water content of from about 5% to about 10%, by weight, and a particle size of from about 30 μm to about 50 μm.

In embodiments, the fine particle coal has a BTU that is suitable for use as steam coal. As used herein, the phrase "a BTU that is suitable for use as steam coal" means a BTU of from about 6,000 to about 13,500 when the fine particle coal has a water content of from about 5% to about 20%, by weight. In some embodiments, the fine particle coal has a BTU of from about 7,000 to about 13,500 and a water content of from about 5% to about 20%, by weight. In further embodiments, the fine particle coal has a BTU of from about 9,000 to about 13,500 and a water content of from about 5% to about 20%, by weight.

In particular embodiments, the fine particle coal has an ash content of from about 3% to about 28%, by weight. In embodiments, the fine particle coal has an ash content of from about 3% to about 15%, by weight. In some embodiments, the fine particle coal has an ash content of from about 3% to about 10%, by weight. In further embodiments, the fine particle coal has an ash content of from about 5% to about 10%, by weight. In still further embodiments, the fine particle coal has an ash content of from about 6% to about 8%, by weight. In one embodiment, the fine particle coal has an ash content of less than 6%, by weight.

In embodiments, the fine particle coal has an ash content of from about 3% to about 15%, by weight, a BTU of from about 12,000 to about 16,000, a water content of from about 5% to about 15%, by weight, and a particle size of 1000 μm or smaller. In embodiments, the fine particle coal has an ash content of from about 3% to about 15%, by weight, a BTU of from about 12,000 to about 16,000, a water content of from about 5% to about 15%, by weight, and a particle size of 100 mesh or smaller. In further embodiments, the fine particle coal has an ash content of from about 5% to about 10%, by weight, a BTU of from about 14,000 to about 16,000, a water content of from about 5% to about 10%, by weight, and a particle size of 100 mesh or smaller, wherein about 50%, by weight, of the fine particle coal is retained by 325 mesh.

In embodiments, the fine particle coal has an ash content of from about 3% to about 15%, by weight, a BTU of from about 12,000 to about 16,000, a water content of from about 5% to about 15%, by weight, and a particle size of from about 30 µm to about 150 µm. In further embodiments, the fine particle coal has an ash content of from about 5% to about 10%, by weight, a BTU of from about 14,000 to about 16,000, a water content of from about 5% to about 10%, by weight, and a particle size of from about 30 µm to about 50 µm.

The fine particle coal, in embodiments, has a total sulfur content of from about 0.3% to about 4.5%, by weight. As used herein, the phrase "total sulfur" refers to all sulfur that may be present in the fine particle coal, including sulfate sulfur, organic sulfur, and inorganic sulfur. In certain embodiments, the fine particle coal has a total sulfur content of from about 0.3% to about 2%. In particular embodiments, the fine particle coal has a total sulfur content of from about 0.6% to about 1.3%, by weight. In some embodiments, the fine particle coal has a total sulfur content of from about 0.8% to about 1.3%, by weight. In further embodiments, the fine particle coal has a total sulfur content of about 1.0%, by weight. In other embodiments, the fine particle coal has an organic sulfur content of from about 0.8% to about 0.9%, by weight.

The fine particle coal, in some embodiments, may be suitable for use as coking coal, i.e., metallurgical coal, and has a total sulfur content of less than 0.8%, by weight. The fine particle coal, in other embodiments, may be suitable for use as steam coal, and has a total sulfur content of from about 0.3% to about 4.5%, by weight.

In embodiments, the fine particle coal has a total sulfur content of from about 0.3% to about 4.5%, by weight, an ash content of from about 3% to about 28%, by weight, a BTU of from about 12,000 to about 16,000, a water content of from about 5% to about 15%, by weight, and a particle size of 1000 µm or smaller. In embodiments, the fine particle coal has a total sulfur content of from about 0.3% to about 4.5%, by weight, an ash content of from about 3% to about 28%, by weight, a BTU of from about 12,000 to about 16,000, a water content of from about 5% to about 15%, by weight, and a particle size of 100 mesh or smaller. In some embodiments, the fine particle coal has a total sulfur content of from about 0.3% to about 2%, by weight, an ash content of from about 3% to about 15%, by weight, a BTU of from about 12,000 to about 16,000, a water content of from about 5% to about 15%, by weight, and a particle size of 100 mesh or smaller. In further embodiments, the fine particle coal has a total sulfur content of from about 0.8% to about 1.3%, by weight, an ash content of from about 7% to about 10%, by weight, a BTU of from about 14,000 to about 16,000, a water content of from about 5% to about 10%, by weight, and a particle size of 100 mesh or smaller, wherein from about 40% to about 60%, by weight, of the fine particle coal is retained by 325 mesh.

In embodiments, the fine particle coal has a total sulfur content of from about 0.3% to about 4.5%, by weight, an ash content of from about 3% to about 15%, by weight, a BTU of from about 12,000 to about 16,000, a water content of from about 5% to about 15%, by weight, and a particle size of from about 30 µm to about 150 µm. In some embodiments, the fine particle coal has a total sulfur content of from about 0.3% to about 2%, by weight, an ash content of from about 3% to about 15%, by weight, a BTU of from about 12,000 to about 16,000, a water content of from about 5% to about 15%, by weight, and a particle size of from about 30 µm to about 150 µm. In further embodiments, the fine particle coal has a total sulfur content of from about 0.8% to about 1.3%, by weight, an ash content of from about 7% to about 10%, by weight, a BTU of from about 14,000 to about 16,000, a water content of from about 5% to about 10%, by weight, and a particle size of from about 30 µm to about 50 µm.

The fine particle coal, in embodiments, has a volatile matter content of from about 7% to about 37%, by weight. The fine particle coal, in certain embodiments, has a volatile matter content of from about 7% to about 25%, by weight. The fine particle coal, in some embodiments, has a volatile matter content of from about 10% to about 25%, by weight. The fine particle coal, in further embodiments, has a volatile matter content of from about 10% to about 20%, by weight. The fine particle coal, in some embodiments, has a volatile matter content of from about 15% to about 20%, by weight. The fine particle, in additional embodiments, has a volatile matter content of about 17%, by weight. The fine particle coal, in still further embodiments, is suitable for use as coking coal, i.e., metallurgical coal, and has a volatile matter content of from 15% to about 37%, by weight.

In embodiments, the fine particle coal has a volatile matter content of from about 7% to about 37%, by weight, a total sulfur content of from about 0.3% to about 4.5%, by weight, an ash content of from about 3% to about 28%, by weight, a BTU of from about 12,000 to about 16,000, a water content of from about 5% to about 15%, by weight, and a particle size of 1000 µm or smaller. In embodiments, the fine particle coal has a volatile matter content of from about 7% to about 37%, by weight, a total sulfur content of from about 0.3% to about 4.5%, by weight, an ash content of from about 3% to about 28%, by weight, a BTU of from about 12,000 to about 16,000, a water content of from about 5% to about 15%, by weight, and a particle size of 100 mesh or smaller. In some embodiments, the fine particle coal has a volatile matter content of from about 10% to about 25%, by weight, a total sulfur content of from about 0.3% to about 2%, by weight, an ash content of from about 3% to about 15%, by weight, a BTU of from about 12,000 to about 16,000, a water content of from about 5% to about 15%, by weight, and a particle size of 100 mesh or smaller. In further embodiments, the fine particle coal has a volatile matter content of from about 15% to about 20%, by weight, a total sulfur content of from about 0.8% to about 1.3%, by weight, an ash content of from about 7% to about 10%, by weight, a BTU of from about 14,000 to about 16,000, a water content of from about 5% to about 10%, by weight, and a particle size of 100 mesh or smaller, wherein from about 40% to about 60%, by weight, of the fine particle coal is retained by 325 mesh.

The fine particle coal, in particular embodiments, has a volatile matter content of from about 7% to about 53%, by weight. The fine particle coal, in certain embodiments, has a volatile matter content of from about 7% to about 45%, by weight. In embodiments, the fine particle coal has a volatile matter content of from about 7% to about 37%, by weight, a total sulfur content of from about 0.3% to about 4.5%, by weight, an ash content of from about 3% to about 28%, by weight, a BTU of from about 12,000 to about 16,000, a water content of from about 5% to about 15%, by weight, and a particle size of from about 30 µm to about 150 µm. In some embodiments, the fine particle coal has a volatile matter content of from about 10% to about 25%, by weight, a total sulfur content of from about 0.3% to about 2%, by weight, an ash content of from about 3% to about 15%, by weight, a BTU of from about 12,000 to about 16,000, a water content of from about 5% to about 15%, by weight, and a particle size of from about 30 µm to about 150 µm. In further embodiments, the fine particle coal has a volatile matter content of from about 15% to about 20%, by weight, a total sulfur content of from about 0.8% to about 1.3%, by weight, an ash content of from about 7% to about 10%, by weight, a BTU of from about 14,000 to about 16,000, a water content of from about 5% to about 10%, by weight, and a particle size of from about 30 µm to about 50 µm.

In embodiments, the fine particle coal has a carbon content of from about 80% to about 95%, by weight. In further embodiments, the fine particle coal has a carbon content of from about 80% to about 92%. In particular embodiments, the fine particle coal has a carbon content of from about 80% to about 85%, by weight. In other embodiments, the fine particle coal has a carbon content of about 80%, by weight. The elemental analysis of carbon and other elements may be performed using known methods, including ASTM D-5373-02.

In some embodiments, the fine particle coal has a carbon content of from about 40% to about 95%, by weight. In certain embodiments, the fine particle coal has a carbon content of from about 65% to about 95%, by weight. In a number of embodiments, the fine particle coal has a carbon content of from about 75% to about 95%, by weight. In embodiments, the fine particle coal has a carbon content of from about 80% to about 95%, by weight, a volatile matter content of from about 7% to about 37%, by weight, a total sulfur content of from about 0.3% to about 4.5%, by weight, an ash content of from about 3% to about 15%, by weight, a BTU of from about 12,000 to about 16,000, a water content of from about 5% to about 15%, by weight, and a particle size of 100 mesh or smaller. In further embodiments, the fine particle coal has a carbon content of from about 80% to about 85%, by weight, a volatile matter content of from about 15% to about 20%, by weight, a total sulfur content of from about 0.8% to about 1.3%, by weight, an ash content of from about 7% to about 10%, by weight, a BTU of from about 14,000 to about 16,000, a water content of from about 5% to about 10%, by weight, and a particle size of 100 mesh or smaller, wherein from about 40% to about 60%, by weight, of the fine particle coal is retained by 325 mesh.

Generally, the fine particle coal may have an oxygen content of 20% or less, by weight. The fine particle coal, in certain embodiments, has an oxygen content of from about 0.5% to about 18%, by weight. The fine particle coal, in other embodiments, has an oxygen content of from about 0.5% to about 12%, by weight. The fine particle coal, in some embodiments, has an oxygen content of from about 0.5% to about 8%, by weight. The fine particle coal, in a number of embodiments, has an oxygen content of from about 0.5% to about 5%, by weight. The fine particle coal, in particular embodiments, has an oxygen content of from about 0.5% to about 2%, by weight. The fine particle coal, in embodiments, has an oxygen content of from about 0.5% to about 1.5%, by weight. The fine particle coal, in further embodiments, has an oxygen content of from about 1.0% to about 1.5%, by weight. Not wishing to be bound by any particular theory, it is believed that an oxygen content of about 2% or less, by weight, is beneficial because oxygenation at the surface of the fine particle coal may interfere with the production of CO, which is important in certain industrial processes, including the methods of making steel provided herein.

In embodiments, the fine particle coal has an oxygen content of from about 0.5% to about 1.5%, by weight, a volatile matter content of from about 7% to about 37%, by weight, a total sulfur content of from about 0.3% to about 4.5%, by weight, an ash content of from about 3% to about 15%, by weight, a BTU of from about 12,000 to about 16,000, a water content of from about 5% to about 15%, by weight, and a particle size of 1000 µm or smaller. In embodiments, the fine particle coal has an oxygen content of from about 0.5% to about 1.5%, by weight, a volatile matter content of from about 7% to about 37%, by weight, a total sulfur content of from about 0.3% to about 4.5%, by weight, an ash content of from about 3% to about 15%, by weight, a BTU of from about 12,000 to about 16,000, a water content of from about 5% to about 15%, by weight, and a particle size of 100 mesh or smaller. In further embodiments, the fine particle coal has an oxygen content of from about 1.0% to about 1.5%, by weight, a volatile matter content of from about 15% to about 20%, by weight, a total sulfur content of from about 0.8% to about 1.3%, by weight, an ash content of from about 7% to about 10%, by weight, a BTU of from about 14,000 to about 16,000, a water content of from about 5% to about 10%, by weight, and a particle size of 100 mesh or smaller, wherein from about 40% to about 60%, by weight, of the fine particle coal is retained by 325 mesh.

Blends

In another aspect, blends are provided comprising the fine particle coal and at least one other coal. The fine particle coal and at least one other coal may be blended by any methods know in the art. For example, the blend may be made by depositing alternating loads of the fine particle coal and at least one other coal in a vessel. The blends may be used for PCI, as metallurgical coal, i.e., coking coal, or steam coal. The blend, in some embodiments, is homogeneous. The blend, in other embodiments, is not homogeneous. The at least one other coal and the amounts of each component of the blends may be selected to provide the blend with one or more desired characteristics, financially optimize coal purchases, neutralize one or more disadvantages of at least one of the coal components, or a combination thereof. The desired characteristics may depend on the intended use of the blends.

For example, the at least one other coal may be selected to provide the blend with a desired amount or percentage of water, ash, sulfur, volatile matter, carbon, oxygen, or a combination thereof. As a further example, at least one other coal having a volatile matter content of about 30%, by weight, may be mixed with a certain amount of a fine particle coal having a volatile matter content of about 17%, by weight, to produce a blend having a volatile matter content of less than 30%, by weight. The at least one other coal may be selected to form a blend that is suitable for PCI or for use as steam coal or coking coal, i.e., metallurgical coal. A blend that is suitable for PCI may be a blend that avoids excessive char.

The fine particle coals or blends provided herein may be associated with dregs for storage and transport. As used herein, the term "dregs" refers to any spent grain, sediment, or a combination thereof obtained, for example, from beverage production. As used herein, the phrase "associated with dregs" refers to mixing with dregs, covering with dregs, or a combination thereof, at least a portion of a fine particle coal or blend comprising the fine particle coal and at least one other coal.

Agglomerates

In another aspect, the fine particle coal, or blends comprising the fine particle coal and at least one other coal, may be used to form an agglomerate or part of an agglomerate. The agglomerates, in some embodiments, include the fine particle coal and at least one ore. The agglomerates, in other embodiments, include at least one ore and a blend comprising a fine particle coal and at least one other coal. The ore of the agglomerates may be any metal ore, such as iron ore. The agglomerates may be formed using any techniques known in the art. The agglomerates may be added to a blast furnace, for example, during the production of iron or steel.

Provided herein is a fine particle coal. In embodiments, the fine particle coal has a particle size of 1000 μm or smaller and a water content of from about 5% to about 20%, by weight. In some embodiments, the water content is from about 5% to about 15%, by weight; from about 5% to about 10%, by weight; from about 5% to about 7%, by weight; from about 6% to about 9%, by weight; about 8%, by weight; or about 7%, by weight. The fine particle coal may have a particle size of 100 mesh or smaller. The fine particle coal may have a particle size wherein from about 40% to about 60%, by weight, or about 50%, by weight, of the fine particle coal is retained by 325 mesh. The fine particle coal may have a particle size of 325 mesh or smaller. The fine particle coal may have a BTU of from about 12,000 to about 16,000; from about 12,400 to about 14,000; from about 12,800 to about 16,000; from about 13,500 to about 16,000; from about 14,000 to about 16,000; from about 15,000 to about 16,000; about 12,500; about 13,500; about 14,000; or about 15,500. The fine particle coal may have a total sulfur content of from about 0.3 to about 4.5%, by weight; from about 0.3 to about 2%, by weight; from about 0.6% to about 1.3%, by weight; from about 0.8% to about 1.3%, by weight; from about 0.8% to about 0.9%, by weight; about 1.0%, by weight; or less than about 0.8%, by weight. The fine particle coal may have an ash content of from about 3% to about 28%, by weight; from about 3% to about 15%, by weight; from about 3% to about 10%, by weight; from about 5% to about 10%, by weight; from about 6% to about 8%, by weight; or less than 6%, by weight. The fine particle coal may have a volatile matter content of from about 7% to about 37%, by weight; from about 15% to about 37%, by weight; from about 7% to about 25%, by weight; from about 10% to about 25%, by weight; from about 10% to about 20%, by weight; from about 15% to about 20%, by weight; or about 17%, by weight. The fine particle coal may have a volatile matter content of from about 7% to about 53%, by weight; or from about 7% to about 45%, by weight. The fine particle coal may have a carbon content of from about 40% to about 95%, by weight; from about 65% to about 95%, by weight; from about 75% to about 95%, by weight; from about 80% to about 95%, by weight; from about 80% to about 92%, by weight; or from about 80% to about 85%, by weight. The fine particle coal may have an oxygen content of 2% of less, by weight. The fine particle coal may have an oxygen content of from about 0.5% to about 18%, by weight; from about 0.5% to about 12%, by weight; from about 0.5% to about 8%, by weight; from about 0.5% to about 5%, by weight; from about 0.5% to about 2%, by weight; or from about 0.5% to about 1.5%, by weight. The fine particle coal may have a particle size of from about 30 μm to about 1000 μm; from about 30 μm to about 900 μm; from about 30 μm to about 800 μm; from about 30 μm to about 700 μm; from about 30 μm to about 600 μm; from about 30 μm to about 500 μm; from about 30 μm to about 400 μm; from about 30 μm to about 300 μm; from about 30 μm to about 200 μm; from about 30 μm to about 150 μm; from about 30 μm to about 125 μm; from about 30 μm to about 100 μm; from about 30 μm to about 75 μm; from about 30 μm to about 50 μm; or about 44 μm.

Methods of Making Coke

In a further aspect, methods for making coke are provided. In embodiments, the method includes heating, in the absence of air, a fine particle coal described herein, or a blend comprising the fine particle coal and at least one other coal, for a time and temperature sufficient to convert the fine particle coal or the blend to coke. In particular embodiments, the fine particle coal has a particle size of 1000 μm or smaller and a water content of from about 5% to about 20%, by weight.

Generally, the fine particle coal, or blends comprising the fine particle coal and at least one other coal, may be converted to coke using techniques known in the art. For the coke making processes provided herein, the fine particle coal, or blend comprising the fine particle coal and at least one other coal, in embodiments, has a water content of from about 5% to about 10%, by weight, an ash content of less than 10%, by weight, a volatile matter content of from about 15% to about 37%, by weight, a sulfur content of less than 1.0%, by weight, and a fixed carbon content of from about 60% to about 74%, by weight. For the coke making processes provided herein, the fine particle coal, or blend comprising the fine particle coal and at least one other coal, in some embodiments, has a water content of from about 5% to about 7%, by weight, an ash content of less than 8%, by weight, a volatile matter content of from about 15% to about 25%, by weight, a sulfur content of less than 0.8%, by weight, and a fixed carbon content of from about 60% to about 74%, by weight.

Methods of making coke are provided. In embodiments, the methods of making coke comprise heating, in the absence of air, a fine particle coal, or a blend comprising the fine particle coal and at least one other coal, for a time and temperature sufficient to convert the fine particle coal or the blend to coke, wherein the fine particle coal has a particle size of 1000 μm or smaller and a water content of from about 5% to about 20%, by weight. The fine particle coal may have a water content of from about 5% to about 10%, by weight, an ash content of less than 10%, by weight, a volatile matter content of from about 15% to about 37%, by weight, a sulfur content of less than 1.0%, by weight, and a fixed carbon content of from about 60% to about 74%, by weight. The fine particle coal may have a water content of from about 5% to about 7%, by weight, an ash content of less than 8%, by weight, a volatile matter content of from about 15% to about 25%, by weight, a sulfur content of less than 0.8%, by weight, and a fixed carbon content of from about 60% to about 74%, by weight. The fine particle coal may have a particle size of 100 mesh or smaller; or a particle size of 325 mesh or smaller.

Methods of Making Steel

In yet another aspect, methods are provided for making steel that rely, in part, on the fine particle coal described herein. The fine particle coal or a blend comprising the fine particle coal and at least one other coal, in embodiments, is used for PCI in the steel making processes provided herein. In other words, the fine particle coal, or blend, may be used in any of the coal injection processes known in the art. In one embodiment, the method for making steel includes injecting a fine particle coal described herein, or a blend comprising a fine particle coal and at least one other coal, into a blast furnace containing coke and iron ore. In a particular embodiment, the fine particle coal used for PCI has a particle size of 1000 µm or smaller and a water content of from about 5% to about 20%, by weight. In a further embodiment, the fine particle coal used for PCI has a particle size of 200 mesh or smaller and a water content of from about 5% to about 20%, by weight. In a still further embodiment, the fine particle coal used for PCI has a particle size of 200 mesh or smaller and a water content of from about 8% to about 10%, by weight.

In a particular embodiment, the fine particle coal or blend replaces up to 40% of the coke required in standard, non-PCI steel making processes. In one embodiment, the steel making processes provided herein reach a coke rate of from about 275 kg/ton hot metal to about 325 kg/ton hot metal with injection levels of from about 175 kg/ton hot metal to about 225 kg/ton hot metal of a fine particle coal or blend comprising the fine particle coal and at least one other coal. In another embodiment, the steel making processes provided herein reach a coke rate of from about 290 kg/ton hot metal to about 310 kg/ton hot metal with injection levels of from about 190 kg/ton hot metal to about 210 kg/ton hot metal of a fine particle coal or blend comprising the fine particle coal and at least one other coal. In a further embodiment, the steel making processes provided herein reach a coke rate of about 300 kg/ton hot metal with injection levels of about 200 kg/ton hot metal of a fine particle coal or blend comprising the fine particle coal and at least one other coal.

In embodiments, the fine particle coal, or a blend comprising the fine particle coal and at least one other coal, is injected in equal amounts through all the tuyeres of a blast furnace.

In embodiments, the replacement ratio of the fine particle coal, or blend comprising the fine particle coal and at least one other coal, is from about 0.7 to about 0.9 kg fine particle coal or blend per kg coke. In other embodiments, the replacement ratio of the fine particle coal, or blend comprising the fine particle coal and at least one other coal, is from about 0.8 to about 0.9 kg fine particle coal or blend per kg coke. In further embodiments, the replacement ratio of the fine particle coal, or blend comprising the fine particle coal and at least one other coal, is about 0.85 kg fine particle coal or blend per kg coke. The replacement ratio of the fine particle coal, or blend, can be calculated with a mass and heat balance of a furnace, and the chemical composition of the fine particle coal, or blend.

Where appropriate, various ASTM procedures were used to analyze the fine particle coal for the characteristics provided herein.

Methods are provided herein for making iron or steel. In embodiments, the methods of making iron or steel comprise injecting a fine particle coal, or a blend comprising a fine particle coal and at least one other coal, into a blast furnace containing coke and iron ore, wherein the fine particle coal has a particle size of 1000 µm or smaller and a water content of from about 5% to about 20%, by weight. The fine particle coal may have a particle size of 100 mesh or smaller and a water content of from about 5% to about 20%, by weight. The fine particle coal may have a particle size of 100 mesh or smaller and a water content of from about 8% to about 10%, by weight. The fine particle coal or blend may replace up to 40% of the coke required in standard, non-PCI steel making processes. The blast furnace may reach a coke rate of from about 275 kg/ton hot metal to about 325 kg/ton hot metal with injection levels of from about 175 kg/ton hot metal to about 225 kg/ton hot metal of a fine particle coal or blend comprising the fine particle coal and at least one other coal. The blast furnace may reach a coke rate of from about 290 kg/ton hot metal to about 310 kg/ton hot metal with injection levels of from about 190 kg/ton hot metal to about 210 kg/ton hot metal of a fine particle coal or blend comprising the fine particle coal and at least one other coal. The blast furnace may reach a coke rate of about 300 kg/ton hot metal with injection levels of about 200 kg/ton hot metal of a fine particle coal or blend comprising the fine particle coal and at least one other coal. The fine particle coal or the blend may be injected in equal amounts through all the tuyeres of the blast furnace. The replacement ratio of the fine particle coal, or blend comprising the fine particle coal and at least one other coal, may be from about 0.7 to about 0.9 kg fine particle coal or blend/kg coke; from about 0.8 to about 0.9 kg fine particle coal or blend/kg coke; or about 0.85 kg fine particle coal or blend/kg coke. The fine particle coal may have a particle size of 100 mesh or smaller; or a particle size of 325 mesh or smaller.

It should be appreciated that various of the above-disclosed and other features, properties, and functions, or alternatives thereof, may be desirably combined into many other different products, methods, systems, apparatuses, or applications, which are intended to come within the scope of the appended claims. Various presently unforeseen or unanticipated alternatives, modifications, variations, or improvements thereto may be subsequently made by those skilled in the art, which are also intended to come within the scope of the appended claims.

I claim:

1. A method of collecting fine particle coal, the method comprising:
   dewatering a clean coal effluent slurry having a solids content of from about 3% to about 17%, by weight, to produce a fine particle coal having—
   (i) a particle size of 1000 µm or smaller, and
   (ii) an ash content of from about 3% to about 28%, by weight,
   wherein the dewatering of the clean coal effluent slurry comprises centrifuging the slurry in a solid bowl centrifuge, the centrifuge comprising a rotating bowl, an internal scroll, and a weir plate; and
   adjusting, based on (i) properties of the clean coal effluent slurry, (ii) properties of the fine particle coal, or (iii) both, at least one parameter selected from the group consisting of centrifugal torque, differential rotational speed between the rotating bowl and the internal scroll, and dam height of the weir plate.

2. The method of claim 1, wherein the fine particle coal has an ash content of from about 3% to about 15%, by weight.

3. The method of claim 1, wherein the fine particle coal has an ash content of from about 5% to about 10%, by weight.

4. The method of claim 1, wherein the fine particle coal has an ash content of less than 6%, by weight.

5. The method of claim 1, wherein the particle size of the fine particle coal is 100 mesh or smaller.

6. The method of claim 1, wherein the particle size of the fine particle coal is from about 30 µm to about 150 µm.

7. The method of claim 1, wherein the step of dewatering occurs in a clean coal circuit of a coal processing plant.

8. The method of claim 1, wherein the step of dewatering occurs downstream of processing that does not collect fine particle coal having a particle size of 325 mesh or smaller.

9. The method of claim 1, wherein the step of dewatering occurs upstream of processing that does collect fine particle coal having a particle size of 325 mesh or smaller.

10. The method of claim 1, wherein the fine particle coal has a BTU of from about 12,000 to about 16,000.

11. The method of claim 1, wherein the fine particle coal has a BTU of from about 15,000 to about 16,000.

12. The method of claim 1, wherein the fine particle coal has a total sulfur content of from about 0.3% to about 4.5%, by weight.

13. The method of claim 1, wherein the fine particle coal has a total sulfur content of less than 0.8%, by weight.

14. The method of claim 1, wherein the fine particle coal has a volatile matter content of from about 7% to about 37%, by weight.

15. The method of claim 1, wherein the fine particle coal has a volatile matter content of from about 15% to about 20%, by weight.

16. The method of claim 1, wherein the fine particle coal has an oxygen content of 20% or less, by weight.

17. The method of claim 1, wherein the fine particle coal has an oxygen content of 2% or less, by weight.

18. A method of collecting fine particle coal, the method comprising:
   dewatering a clean coal effluent slurry having a solids content of from about 3% to about 20%, by weight, to produce a fine particle coal having—
   (i) a particle size of 1000 μm or smaller, and
   (ii) an ash content of from about 3% to about 28%, by weight,
   wherein the dewatering of the clean coal effluent slurry comprises centrifuging the slurry in a solid bowl centrifuge, the centrifuge comprising a rotating bowl, an internal scroll, and a weir plate; and
   adjusting, based on (i) properties of the clean coal effluent slurry, (ii) properties of the fine particle coal, or (iii) both, at least one parameter selected from the group consisting of centrifugal torque, differential rotational speed between the rotating bowl and the internal scroll, and dam height of the weir plate.

19. The method of claim 18, wherein the clean coal effluent slurry has a solids content of from about 3% to about 17%, by weight.

20. The method of claim 18, wherein the fine particle coal has an ash content of from about 3% to about 15%, by weight.

21. The method of claim 18, wherein the fine particle coal has a total sulfur content of from about 0.3% to about 4.5%, by weight.

22. The method of claim 18, wherein the fine particle coal has a volatile matter content of from about 7% to about 37%, by weight.

23. The method of claim 18, wherein the fine particle coal has a volatile matter content of from about 15% to about 20%, by weight.

* * * * *